United States Patent Office 2,785,076
Patented Mar. 12, 1957

2,785,076

FROZEN PINEAPPLE PRODUCT

George E. Felton, Honolulu, Territory of Hawaii, assignor to Hawaiian Pineapple Company, Limited, Honolulu, Territory of Hawaii, a corporation of Hawaii No Drawing. Application August 6, 1954,
Serial No. 448,379

6 Claims. (Cl. 99—193)

This invention relates to the protection of frozen pineapple, pineapple juice and/or other frozen pineapple products from oxidative effects detrimental to the taste and flavor of the product.

The tendency of fruit products to develop off-flavors as the result of oxidative effects is well known, although in some cases a complete understanding of the nature of the changes involved has not yet been achieved. Considerable protection against oxidative deterioration can of course be secured by storing the fruit in evacuated, hermetically sealed containers, but even under these conditions sufficient air remains to cause an objectionable amount of deterioration, and further the use of such containers often is not feasible. For these reasons much time and effort have been expended in investigating the nature of such oxidative changes and in finding ways of inhibiting or preventing them.

Many oxidative changes are of such nature that they are largely inhibited or even eliminated for practical purposes at the low temperatures prevailing in the frozen storage of foods, say around 0° F. With some fruits, however, other oxidative changes of a different nature may take place even during frozen storage. It has been found that the development of such oxidized off-flavors in frozen storage varies with different kinds of fruit and that the need for protection also varies. With some fruits, the off-flavor developed is weaker than the natural flavor of the fruit and hence not noticeable until it is present in rather high concentration. Frozen strawberries, for example, have a strong natural flavor that masks oxidative off-flavors until they become quite strong. Frozen orange juice will also mask oxidative off-flavors, to a substantial extent but if sufficient oxygen is present undesirable flavors will develop.

Frozen pineapple products are especially susceptible to deterioration of flavor due to oxidation. Strong foreign flavors develop during prolonged frozen storage which may be described as cardboard-like, although of course other terms may be used to depict their taste characteristics. Also a bleaching of the yellow pigment takes place with an almost complete loss of color in the fruit. It has been found that these changes cannot be prevented by heat treatment prior to freezing and hence they are not enzymatic in nature. They involve the formation of volatile compounds that can be removed by distillation, but these compounds are not produced from volatile constituents of the fresh juice because they develop in pineapple juice that has been concentrated by evaporation under vacuum. Certain anti-oxidants that have proved useful with certain other fruits and food products, such as ascorbic acid, are of no benefit in preventing oxidative changes in frozen pineapple.

Such oxidative off-flavors tend to weaken in intensity and often to disappear entirely on prolonged storage. However, the length of time required for such natural disappearance of the off-flavor is too great for practical control by this means, especially since the rate of disappearance depends upon the temperature and is greatest around 40° F. but very slow at the temperatures at which frozen foods are stored, say 0° F.

It should be noted again that these off-flavors developed in frozen storage differ materially in nature from those normally associated with exposure to oxygen at atmospheric temperatures. It is well known that the latter are inhibited to a very substantial degree at low temperatures, a fact which is often cited as an important advantage of frozen storage. The off-flavors which develop in frozen pineapple have opposite characteristics; they are inhibited at temperatures above the freezing point and develop more rapidly in the product after it has been frozen and quite readily at around 0° F. These differences in the character of the products formed in the two cases appear to explain why heretofore recognized anti-oxidants such as ascorbic acid are ineffective in frozen pineapple.

I have found that these objectionable changes in frozen pineapple are caused at least in large part by the presence of iron. Even very slight amounts of ferric ion, for example, 5 p. p. m. or less, cause rapid deterioration of flavor and color. Sufficient iron can be taken up from stainless steel equipment to materially influence the amount of oxidized flavor produced. The amount of off-flavor developed depends on the concentration of the contaminating heavy metal ion and variations in this element due to the composition of the fruit and/or the conditions of processing of the fruit will alter the rate of production of the off-flavor as well as its intensity.

The deleterious effects of ferric ion are shown by the following tests:

TABLE 1

*Taste test on frozen crushed pineapple with added iron*

| Iron Level, p. p. m. | After One Week | After Three Weeks |
|---|---|---|
| 0 | Good | Good. |
| 1 | Good | Good. |
| 2 | Good | Ox. |
| 3 | Good | Ox. |
| 4 | Ox | Ox. |
| 5 | Ox | Ox. |

I have further found that development of off-flavors in frozen pineapple products due to the above causes can be materially inhibited, and in many cases substantially prevented at least during the periods required for commercial storage and distribution, by the addition to the pineapple product before freezing of a small amount of stannous chloride or of stannous sulfate. The amount to be added is not critical; levels as low as 3 to 5 parts per million of tin in the form of one of these salts have been found effective in some cases, while in others it may be preferred to add 25 to 50 parts per million. Still larger amounts can be added if desired, but usually are not necessary to provide adequate protection. That such additions are unobjectionable is evident from the fact that the tin level in pineapple products heat processed in bright tin cans and stored for periods approaching one year is between 100 and 200 p. p. m.

Evidently the desired amount of stannous chloride or of stannous sulfate can be added to the pineapple product in any suitable way and at any suitable point in its processing prior to freezing. The use of one of these stabilizing agents (or if desired a mixture thereof, or materials which react to produce one or both of them in situ) is desirable in all types of containers for frozen pineapple, since even in the case of bright tin cans the product to be frozen is not usually heat treated in the can before freezing and hence the tin level may be too low to afford the required protection. Enameled cans are often considered preferable for fruit products from the standpoint of corrosion resistance and appearance on opening and also because of economy since the tin coating in the can may be much thinner. In such enameled cans, however, the opportunity for the product to pick up tin from the can is materially less than in bright tin cans and the need for one of the aforementioned stabilizing agents is correspondingly greater. But their use is most advantageous in the case of non-metallic containers such as polyethylene or cellophane packages which are very desirable from the standpoints of cost and ease of handling but heretofore have not been satisfactory for frozen pineapple because they permit some diffusion of air into the product with resulting more rapid development of oxidized off-flavors. The addition of small amounts of stannous chloride or stannous sulfate to the fruit makes possible the use of such containers with excellent storage life as shown by the following illustrative tests.

Crushed pineapple was stored at 0° F. in laminated cellophane-polyethylene bags after being treated with stannous chloride at rates of 0, 10, 25 and 50 p. p. m. of tin. In one series the crushed pineapple was unheated. In a second series the crushed pineapple had been heated to 180° F. in a stainless steel pan before being treated with stannous chloride and filled into the plastic containers. The results of taste tests after storage are given in Table 2.

TABLE 2

*Taste test results on frozen crushed pineapple treated with stannous chloride*

| Treatment and Amount of Tin Added as Stannous Chloride | Stores at 0° F. for— | | | | |
|---|---|---|---|---|---|
|  | 0 | 1 wk. | 2 wks. | 1 mo. | 3 mos. |
| Unheated: |  |  |  |  |  |
| 0 p. p. m. Tin | good | good | fair | poor | fair. |
| 10 p. p. m. Tin | good | good | good | good | good. |
| 25 p. p. m. Tin | good | good | good | good | good. |
| 50 p. p. m. Tin | good | good | good | good | good. |
| Heated to 180° F.: |  |  |  |  |  |
| 0 p. p. m. Tin | good | poor | poor | poor | poor. |
| 10 p. p. m. Tin | good | poor | poor | poor | poor. |
| 25 p. p. m. Tin | good | fair | good | fair | fair. |
| 50 p. p. m. Tin | good | good | good | good | good. |

Similar results have been obtained with stannous sulfate, as follows:

TABLE 3

*Taste test results on frozen crushed pineapple treated with stannous sulfate*

| Amount of Tin Added on Stannous Sulfate | Storage at 0° F. for— | | |
|---|---|---|---|
|  | 1 Week | 2 Weeks | 4 Weeks |
| 0 p. p. m. tin | Poor | Poor | Poor. |
| 5 p. p. m. tin | Good | Good | Fair. |
| 10 p. p. m. tin | Good | Good | Good. |

It will be understood that the invention is not restricted to the details of the foregoing description and that reference should be had to the appended claims for a definition of its limits.

What is claimed is:

1. A frozen pineapple product containing a stabilizing agent selected from the group consisting of stannous chloride and stannous sulfate whereby the development of off-flavors during frozen storage is inhibited.

2. A frozen pineapple product containing stannous chloride whereby the development of off-flavors during frozen storage is inhibited.

3. A frozen pineapple product containing stannous sulfate whereby the development of off-flavors during frozen storage is inhibited.

4. The method of inhibiting the development of off-flavors in frozen pineapple containing a heavy metal catalyst which comprises the step of adding to the pineapple product before freezing a stabilizing agent selected from the group consisting of stannous chloride and stannous sulfate.

5. The method of inhibiting the development of off-flavors in frozen pineapple containing a heavy metal catalyst which comprises the step of adding stannous chloride to the pineapple product before freezing said product.

6. The method of inhibiting the development of off-flavors in frozen pineapple containing a heavy metal catalyst which comprises the step of adding stannous sulfate to the pineapple product before freezing said product.

References Cited in the file of this patent

UNITED STATES PATENTS

| 775,066 | Jacobs | Nov. 15, 1904 |
| 1,039,350 | Baldwin | Sept. 24, 1912 |
| 1,964,143 | Taylor | June 26, 1934 |
| 2,286,998 | Jones | June 16, 1942 |
| 2,287,668 | Butler | June 23, 1942 |